Oct. 6, 1953 M. T. SGRICCIA 2,654,465
FEEDER BOWL
Filed Dec. 9, 1950 2 Sheets-Sheet 1
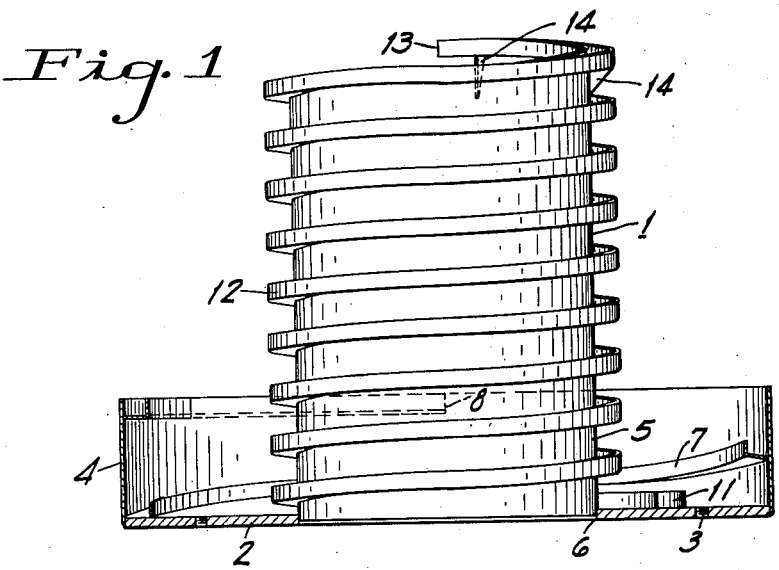
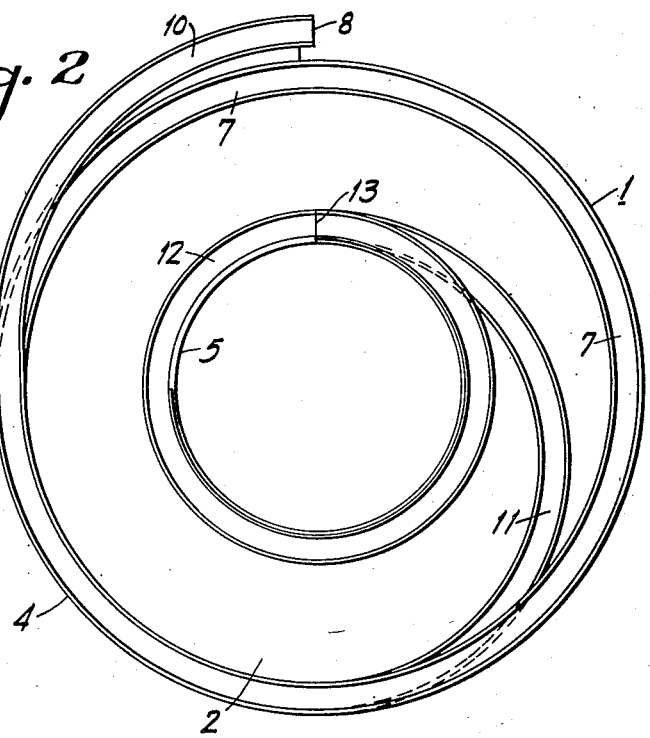
INVENTOR.
Mario T. Sgriccia
BY
His Attorney.

Oct. 6, 1953  M. T. SGRICCIA  2,654,465
FEEDER BOWL

Filed Dec. 9, 1950  2 Sheets-Sheet 2

INVENTOR.
Mario T. Sgriccia
BY William D. Carothers
His Attorney.

Patented Oct. 6, 1953

2,654,465

UNITED STATES PATENT OFFICE 2,654,465

FEEDER BOWL

Mario T. Sgriccia, Homer City, Pa., assignor to Syntron Company, Homer City, Pa., a corporation of Delaware Application December 9, 1950, Serial No. 200,083

4 Claims. (Cl. 198—220)

This invention relates generally to feeder bowls and more particularly to the conveyor feeder bowl for traveling each of a series of articles through ascending and descending paths for the purpose of functioning as a storage or an accumulator for articles between consecutive machines in a production line or for thermally treating the articles as they progress.

The principal object of this invention is to provide a conveyor path which is of considerable extent and wherein the inlet and outlet may be located at the same or different levels or different relative positions. The conveyor track between the inlet and outlet functions as a storage reservoir for the purpose of maintaining a supply of articles that may be fed independently in turn to one machine regardless of the rate of delivery of the articles from another machine.

Another object of this invention is the provision of a storage feeder bowl which provides a pair of inner and outer annular walls for supporting a descending and an ascending conveyor track for the purpose of depositing the articles in the bottom of the bowl and then picking them up and delivering them to the upper edge of the other annular wall of the bowl thereby providing a storage not only along the helical conveyor path but in the bottom of the bowl.

Another object of this invention is the provision of a continuous conveyor track supported by upstanding annular wall means, which track descends and ascends to provide a storage space for receiving and delivering articles in turn consecutively and preventing them from tumbling or otherwise becoming chipped or marred while striking one another. In this structure the track is continuous and the articles stay in line from one end to the other.

Other objects and advantages appear hereinafter in the following description and claims.

The accompanying drawings show, for the purpose of exemplification without limiting the invention or claims thereto, certain practical embodiments of the invention wherein:

Fig. 1 is a view partly in section and partly in elevation showing one form of feeder bowl comprising this invention.

Fig. 2 is a plan view of the structure shown in Fig. 1.

Figure 3:
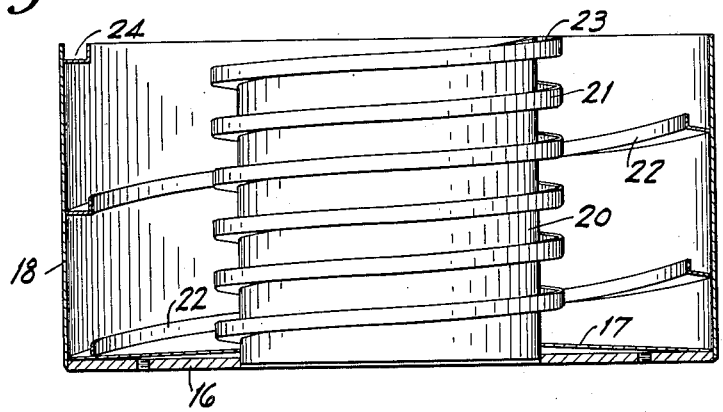
Fig. 3 is a view partly in vertical section and partly in elevation showing a bowl having inner and outer annular walls of substantially the same height with the conveyor paths terminating at the bottom of each wall for the purpose of increasing the storage and for transferring the articles from one conveyor to the other.

Referring to Figs. 1 and 2 of the drawing the feeder storage bowl 1 comprises the base member 2 having the threaded openings 3 for mounting the same on a vibratory feeder motor.

The base member 2 has the outer upstanding annular wall 4 secured to its perimeter and the inner upstanding annular wall 5 secured in its central opening 6. Thus the bowl member 1 is provided with two upstanding annular walls, which for all pratical purposes are substantially concentric to one another but may be arranged eccentrically, if the character of the articles and the conveyor track or path requires such a structure.

As shown the storage bowl 1 is provided with a conveyor path 7 which starts from the inlet 8 with the spiral section 10 that passes through the upstanding wall 4 and travels downwardly in an annular helical path until it reaches the bottom or base member 2 of the bowl and thence travels across the base in a continuous spiral path as indicated at 11 to the bottom of the helical path 12, thence upwardly on the outside of the inner annular wall 5 to the top thereof, as indicated at 13, which is tangent to the helix of the conveyor track section 12 and which is slightly above the annular wall 5, being supported by the brackets 14 as shown in Figs. 1 and 2.

The articles are deposited at the intake 8 and they travel downwardly to the bottom of the bowl and then across the bottom of the bowl and upwardly to the outlet 13. The inlet 8 and the outlet 13 are relatively close to one another, although one is higher than the other as indicated on the drawings. Thus the continuous conveyor path for the articles provides a storage by causing the articles to travel downwardly and then upwardly in their circuit through the feeder bowl.

Figure 4:
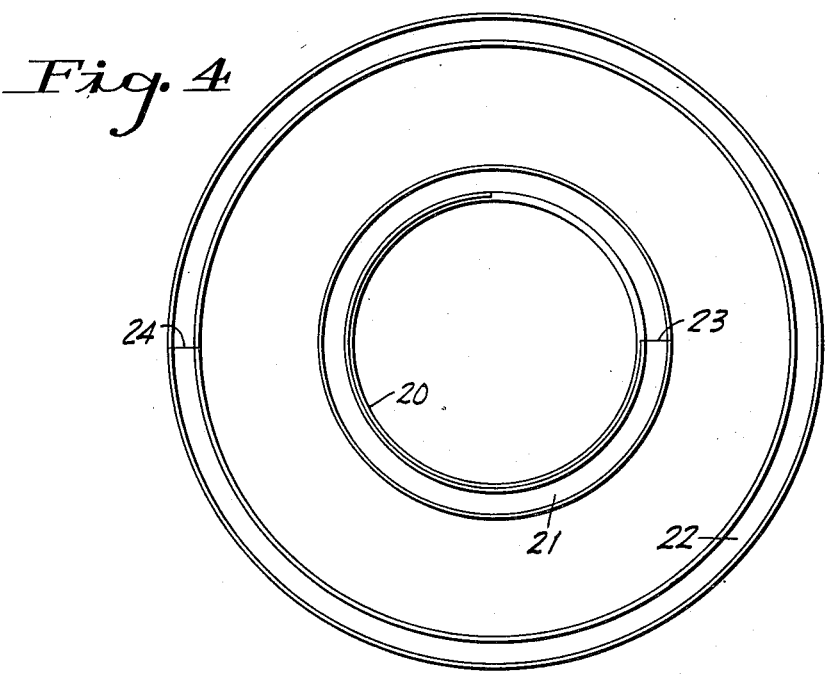
Fig. 4 is a plan view of the structure shown in Fig. 3.

In the structure shown in Figs. 3 and 4 the base member 16 has a conically shaped bowl floor 17, and the outer annular wall 18 is secured to the base 16 and extends upwardly substantially the same distance as the inner annular wall 20. The inner annular wall 20 is provided with a downwardly extending conveyor path 21 that discharges the articles on the bottom 17 of the conveyor bowl and from whence the articles travel across the conical surface 17 of the bowl to where they are picked up by one or more of the conveyor tracks 22 that travel up on the inside of the bowl 18, the articles being inserted in the inlet 23 and being discharged from the outlet 24. In this instance the articles are not retained in turn but may pile up or be otherwise stored in the bottom of the bowl. Such articles should be able to tumble and strike one another without injuring themselves. However, when it is desirable that the articles not tumble or not strike or come in contact with each other, then it is preferable to use the continuous conveyor path as disclosed in Figs. 1 and 2. By making the inlet 23 and the outlet 24, 180° from each other, the storage conveyor unit as disclosed in this structure may be positioned between adjacent machines of the production line requiring that the articles travel substantially the same horizontal plane.

While, for clarity of explanation, certain embodiments of this invention have been shown and described, it is to be understood that this invention is capable of many modifications and changes in construction and arrangement of parts, and certain parts may be employed without the conjoint use of other parts and without departing from the spirit and scope of this invention.

I claim:

1. A conveyor feeder bowl which comprises, base means adapted to be secured to a feeder motor, and an inner and an outer upstanding annular wall member mounted concentrically in spaced relation to each other on said base means, a helically disposed conveyor track mounted on each annular wall member, the articles traveling down one wall member across the base means and up the other annular wall member, and an inlet and an outlet for said conveyor track.

2. A conveyor feeder bowl which comprises, base means adapted to be secured to a feeder motor, and an inner and an outer upstanding annular wall member mounted concentrically in spaced relation to each other on said base means, a helically disposed conveyor track mounted on each annular wall member, the articles traveling down the outer face of the inner wall member across the base means and up the inner face of the outer annular wall member, and an inlet on the upper end of the conveyor track on the outer wall member and an outlet on the upper end of the conveyor track on the inner wall member.

3. A conveyor feeder bowl which comprises, a base forming the bottom of the bowl and having means to secure it to a feeder motor, upstanding concentric cylindrical walls mounted on said base in spaced relation to each other to form the bowl therebetween, a helical conveyor track formed into a series of annular turns on each of the opposite faces of said concentric cylindrical walls, each helical conveyor track for simultaneously conveying the material therealong.

4. The structure of claim 3 characterized in that the articles travel down one helical conveyor track and continue along a defined path across the base and up the other helical conveyor track.

MARIO T. SGRICCIA.

References Cited in the file of this patent

UNITED STATES PATENTS

| Number | Name | Date |
|---|---|---|
| Re. 22,904 | Carrier, Jr. | Aug. 12, 1947 |
| 973,921 | Dodge | Oct. 25, 1910 |
| 2,464,216 | Devol | Mar. 15, 1949 |

FOREIGN PATENTS

| Number | Country | Date |
|---|---|---|
| 279,119 | Great Britain | Oct. 15, 1927 |
| 943,865 | France | Oct. 11, 1948 |